United States Patent [19]
Young et al.

[11] 3,941,214
[45] Mar. 2, 1976

[54] CONTROL SYSTEM FOR A TRANSPORTATION SYSTEM

[75] Inventors: Christopher Young, Glendale; John T. Maynard, New Berlin, both of Wis.

[73] Assignee: Armor Elevator Company, Inc., Louisville, Ky.

[22] Filed: Apr. 29, 1974

[21] Appl. No.: 465,270

[52] U.S. Cl. .............................................. 187/29 R
[51] Int. Cl.² ......................................... B66B 1/30
[58] Field of Search ...................... 187/29; 318/561

[56] References Cited
UNITED STATES PATENTS

| | | | |
|---|---|---|---|
| 3,350,612 | 10/1967 | Hansen et al. | 187/29 |
| 3,523,232 | 8/1970 | Hall et al. | 187/29 |
| 3,584,706 | 6/1971 | Hall et al. | 187/29 |
| 3,627,080 | 12/1971 | Yuminoka | 187/29 |
| 3,783,974 | 1/1974 | Gilbert et al. | 187/29 |
| 3,826,236 | 8/1974 | Close | 318/561 |

*Primary Examiner*—Robert K, Schaefer
*Assistant Examiner*—W. E. Duncanson, Jr.
*Attorney, Agent, or Firm*—Andrus, Sceales, Starke & Sawall

[57] ABSTRACT

A solid state static converter is connected to receive a three-phase A.C. input and directly supply a direct current output to a D.C. motor which operates a traction sheave to control the movement of an elevator car. The magnitude and direction of the direct current output from the static converter is controlled by an error signal derived by the summation of a speed signal obtained from a tachometer coupled to the motor drive shaft and a vehicle speed command signal provided by a pattern generator and having maximum velocity, acceleration and rate of change of acceleration limitations for safe and smooth control of the elevator car and for accurate stopping at landings.

23 Claims, 3 Drawing Figures

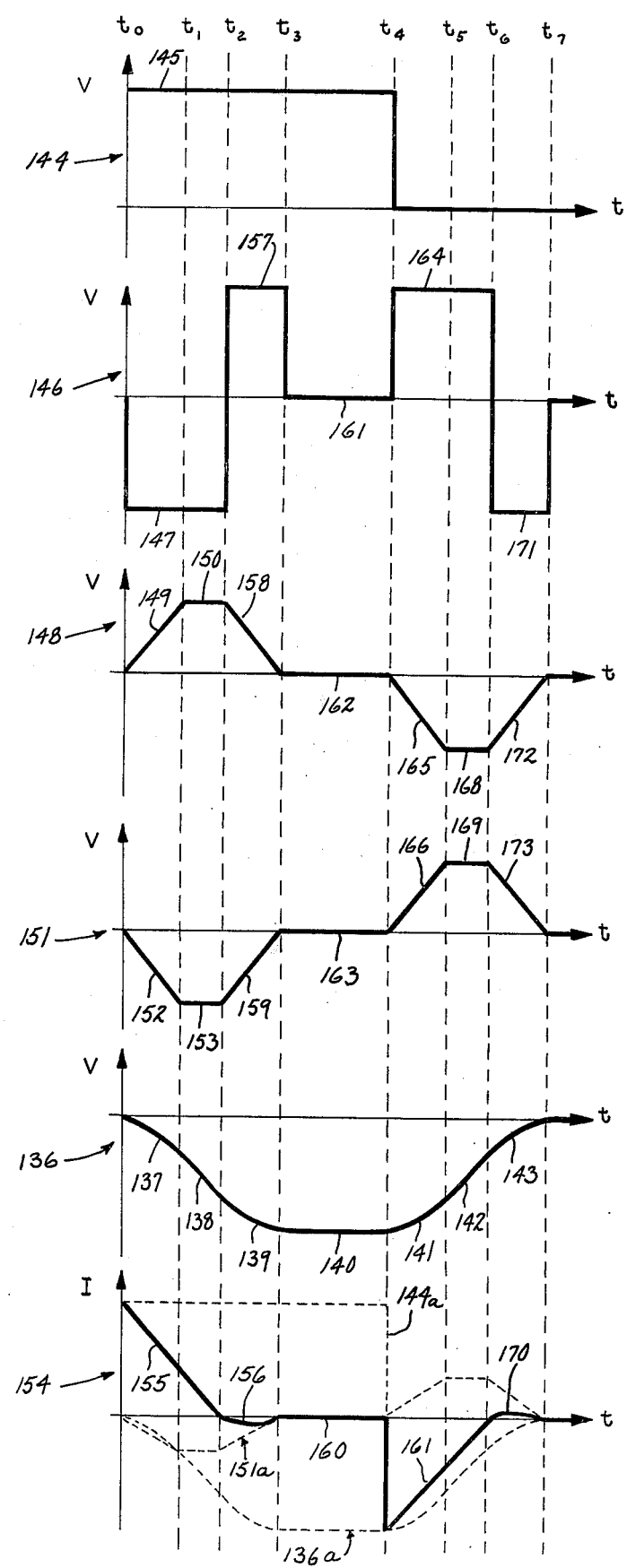

CONTROL SYSTEM FOR A TRANSPORTATION SYSTEM

BACKGROUND OF THE INVENTION

This invention relates to a transportation system and specifically to an apparatus which supplies a vehicle command signal having constraints or limitations for controlling vehicle movement to provide riding comfort and prompt service.

Many types of command signals have been utilized within motor control circuits for comparison with signals which represent the actual operation of the motor and the objects they control to develop an error signal to appropriately energize the motor. Such closed loop control systems have sensed various facets of the operation to develop the operational responsive signals such as, for example, the position of the motor drive shaft or of the object which it controls, the speed of drive shaft rotation or of the object it controls, or the counter-electromotive force (Cemf) sensed at the motor armature circuit. In many prior closed loop control systems, the absence of an error signal has indicated that the motor is operating in accordance with the motor command signal which is thus equal to the magnitude of the motor responsive signal. A difference existing between the command and operational responsive signals indicates that the commanded object is either operating too fast or too slow or is not at a proper position and thus an error signal is developed to correspondingly speed up or slow down the drive motor.

Some prior transportation systems have not precisely defined the commanded velocity, acceleration and rate of change of acceleration or "jerk" required by their pattern or command signal generator. Sych systems have thus experienced relatively sharp transitions in velocity and acceleration which have been tolerable because of the sluggish response of the equipment operated by the controlled motor. With some operating equipment having slow responses, such sharp transitions are sometimes desired in the interest of expediting the output of the motor.

Transportation systems such as elevators require smooth riding characteristics to provide a comfortable ride for passengers and yet it is desirable to minimize the floor to floor time to provide high quality service. In such a system, it is desirable to provide smooth accelerating characteristics and high speed service between floors by maintaining limitations upon the acceleration and rate of change of acceleration commonly referred to as "jerk." It is further desirable to impose a limitation upon the maximum permissible velocity for the controlled vehicle to maintain the vehicle speed within the safe operating limits of the equipment to ensure passenger safety.

Some prior transportation systems have imposed maximum velocity, acceleration and rate of change of acceleration limitations utilizing timed, stepped command signals to control the motor energization. Such systems have frequently permitted the motor to operate sluggishly to mask or conceal the stepped input to provide the desired smooth riding characteristics. The systems providing stepped command signals have not generally provided the precise control over a continuous accelerating and decelerating range and have generally required auxiliary positioning equipment to exact a precise stop at a landing or floor.

Many transportation systems continually sense the vehicle position and provide signals directly proportional thereto in order to accurately control the vehicle movement. Such position responsive controls have been in many cases believed to be required, such as in elevator systems, and particularly to provide a desirable deceleration of the vehicle in order to accurately stop at a landing.

One known system has utilized a position as a function of time command pattern voltage having limitations in maximum obtainable velocity, acceleration and rate of change of acceleration which is compared with a car position voltage to produce a position error signal to control an elevator operation through a Ward-Leonard type motor-generator set, such as disclosed in U.S. Pat. Nos. 3,523,232 and 3,612,220, issued to Hall et al on Aug. 4, 1970 and Oct. 12, 1971, respectively. Such a system as disclosed in the Hall et al patents computes the command pattern voltage by developing a potential difference between an initial car position voltage and a call request voltage while the command pattern is transferred to a signal based upon the car distance from the destination during the period of maximum negative acceleration to achieve the requisite landing accuracy.

Another known system accelerates an elevator car at the same predetermined rate for any length of trip solely as a function of time in response to the operation of a time-controlled speed dictation signal-generating device but decelerates as a function of distance in accordance with the operation of a distance-controlled speed dictation signal generating device, such as disclosed in U.S. Pat. No. 3,552,524, issued to Benjamin et al on Jan. 5, 1971.

SUMMARY OF THE INVENTION

This invention relates to a transportation system such as an elevator in which a motive means is controlled by a command signal having well defined limitations for providing a smooth ride and optimum efficiency.

The transportation system of the present invention provides a time based vehicle controlling speed error signal which is derived from a comparison of a signal proportional to the vehicle speed and a continuous vehicle command pattern speed signal which is capable of accurately accelerating and decelerating the vehicle for starting and stopping at landings. The present invention provides a continuous command pattern speed signal which accurately accelerates and decelerates and stops a controlled vehicle under limitations on maximum velocity, acceleration and rate of change of acceleration without the need of auxiliary control equipment commonly believed to be required in most prior systems, although the invention can be employed with a redundant stopping control, such as a position responsive control for use when the vehicle is very close to a landing.

The transportation system of the present invention further provides a pattern generator which includes a number of signal generators inter-connected in an unusual manner to provide a continuous command pattern signal for providing an exceptionally smooth ride while expediting travel between landings.

In one aspect of the invention, the signal generators within the pattern generator are inter-connected to provide a plurality of separate and distinct closed loop circuits which feedback certain signals within the pattern generator to a common summing circuit for producing an extremely accurate command pattern signal.

In another aspect of the invention, certain signal generators within the pattern generator provide one or more precise operating limitations upon the vehicle operation and provide one or more output signals which are continuously electrically connected in a feedback circuit to an input summing circuit during both acceleration and deceleration of the vehicle.

The pattern generator includes four signal generators which are electrically inter-connected to provide two closed-loop feedback circuits joined at a common summing circuit. A summing circuit is selectively electrically connected to receive the first signal having the limitation upon maximum vehicle velocity and supplies an output signal to the second electrical circuit. The second electrical circuit, in turn, is electrically connected to supply the second signal having the limitation upon maximum vehicle rate of change of acceleration to the third electrical circuit. The third electrical circuit, in turn, is electrically connected to supply the third signal having the limitation upon maximum vehicle acceleration to the fourth electrical circuit and to the summing circuit at the input to the second electrical circuit. The fourth electrical circuit, in turn, is electrically connected to supply the vehicle command signal to the summing circuit at the input to the second electrical circuit and to control the motor energization.

The two feedback circuits are thus continually electrically connected in circuit with the third signal from the third electrical circuit and the fourth signal from the fourth electrical circuit being electrically feedback and summed with the first signal from the first electrical circuit at the summing circuit. The summing circuit thus provides an analog output varying according to the summed magnitude of the first, third and fourth signals to operatively control the operation of the second, third and fourth circuits. The pattern generator effectively provides a closed loop within a closed loop for generating the vehicle command signal which is supplied to a second summing circuit where it is combined with a vehicle responsive signal for providing an error signal to control the operation of the vehicle.

The first electrical circuit includes a positive potential and a negative potential voltage sources which are each clamped to ground by Zener diodes and are selectively connected to the summing circuit through a resistive network for suplying preselected fixed input signals of constant magnitude. The polarity of the current signal supplied to the summing circuit from the first electrical circuit determines the direction of movement for the controlled vehicle during a starting or accelerating sequence while the absence of the first signal initiates a decelerating or stopping sequence. The magnitude of the first signal is maintained at a constant value and determines the maximum permissible velocity obtainable by the vehicle.

The second electrical circuit provides an amplifier having an inverting input connected to the summing circuit and an output connected to the inverting input through a clamping circuit including a pair of Zener diodes connected in series opposition. The amplifier provides a maximum output signal when receiving the first signal from the first electrical circuit which is clamped at a preset magnitude. The output circuit of the first amplifier includes a selectively variable voltage dividing resistive network which is adjusted to provide a predetermined output signal having a preselected magnitude. The preselected magnitude of the second signal is thus determined by the clamped output of the amplifier and the selective setting of the resistive voltage dividing network and defines the maximum permissible rate of change of acceleration or "jerk" of the vehicle.

The third electrical circuit includes a first integrator having an inverting input connected to the selectively variable voltage dividing network at the output of the first amplifier and provides an output which is electrically connected to its inverting input by an integrating capacitor. The first integrator includes a biasing network which supplies preselected positive and negative biasing voltages for selectively establishing the saturation levels of the first integrator in accordance with a predetermined voltage level at the inverting input thereby defining the maximum permissible acceleration that the system can obtain. The third circuit thus directly integrates the output signal supplied from the second circuit and directly imposes a limitation upon the third signal to limit the maximum vehicle acceleration.

The fourth electrical circuit includes a second integrator which has an inverting input connected through a resistive element to the output of the first integrator and an output which is coupled to the inverting input by an integrating capacitor. The output signal supplied by the second integrator constitutes the vehicle command velocity signal as a function of time which is summed with the vehicle velocity signal to provide a motor controlling velocity error signal.

The first or inner closed electrical circuit loop within the pattern generator is provided by the electrical connection of the third signal from the third electrical circuit including the first integrator to the summing circuit through an inverting circuit. The inverting circuit includes a second amplifier having an inverting input connected to receive the third signal from the first integrator and an output connected to the summing circuit. A second selectively variable impedance circuit may optionally be provided to connect the inverting second amplifier within the first closedloop circuit to the summing circuit. The resistance of the second impedance circuit can be changed for adjusting the symmetry of the third signal fedback to the summing circuit when the variable voltage dividing network within the second electrical circuit has been adjusted to provide another predetermined rate of change of acceleration or "jerk."

The second or outer closed electrical circuit loop within the pattern generator is provided by a circuit which connects the fourth signal supplied by the second integrator to the summing circuit.

The pattern generator of the present invention is ideally suited for precisely controlling the operation of a static power converter which receives an alternating current input and supplies controlled amounts of direct current to a D.C. motor for determining or regulating the vehicle speed and direction of travel. While the preferred illustrated embodiment shows a direct static drive, the invention could also be utilized to operate various variable voltage sources such as the typical motor-generator arrangement frequently employed with elevator systems.

The present invention thus provides a pattern generator having a number of signal generators connected to form one or more feedback circuits to supply a continuous vehicle command signal to minimize the floor to floor travel time and provides a pleasing ride for passengers. The vehicle command signal is provided by a minimum of circuit elements which function too accurately control the vehicle movement.

BRIEF DESCRIPTION OF THE DRAWINGS

The drawings furnished herewith illustrate a preferred construction of the present invention in which the above advantages and features are clearly disclosed, as well as others which will be clear from the following description.

In the drawings:

FIG. 3 is a diagrammatic graphical illustration showing various current and voltage waveforms appearing as a plot against time which appear at various circuit locations in FIG. 2.

DESCRIPTION OF THE PREFERRED ILLUSTRATED EMBODIMENT

Figure 1:
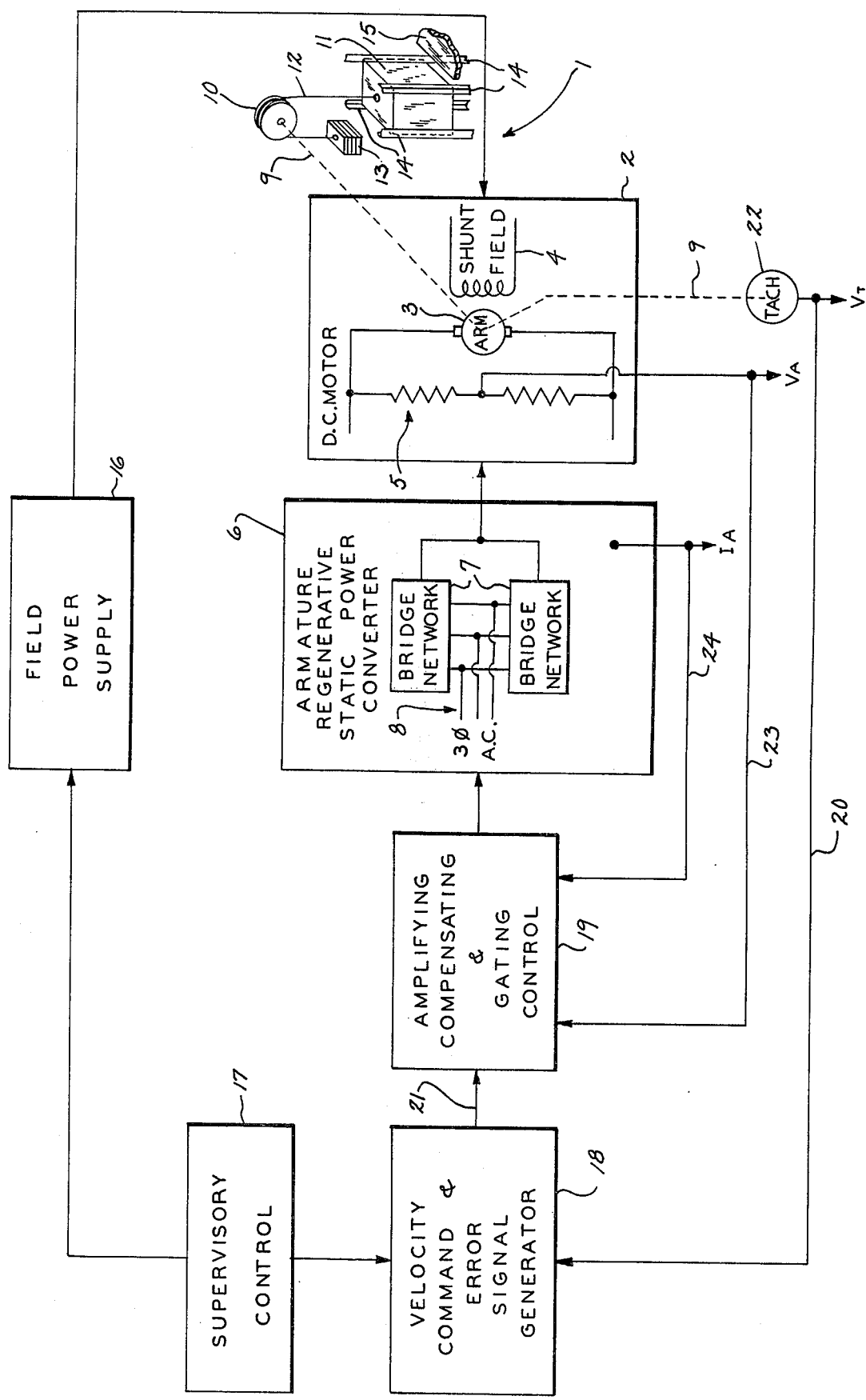
FIG. 1 is a diagrammatical block illustration of an elevator system of the present invention.

Referring to the drawings and particularly FIG. 1, a transportation system includes an elevator system 1 having a direct current drive motor 2 with an armature circuit 3 and a shunt field circuit 4. The armature 3 is connected through an input circuit 5 to an adjustable source 6 of direct current power. The direct current source 6 includes a pair of parallel connected, full-wave, controlled bridge rectifying networks 7 which are connected to a threephase alternating current input 8 and selectively provide controlled amounts of direct current and voltage to the D.C. motor input circuit 5 and thus to armature 3. The bridge networks include a plurality of controlled rectifier devices which are phase controlled to convert electrical power between alternating and direct current by controlling the conduction or firing angle of the controlled rectifier devices. The utilization and selective control of the controlled rectifiers within the bridge networks 7 permits the direction of direct current flow through the armature circuit 3 to be reversed when desired to provide regenerative braking control as well as forward and reverse operation of the D.C. motor 2. The controlled source 6 can be connected and operated as illustrated in the patents to Maynard, U.S. Pat. Nos. 3,716,771 issued on Feb. 13, 1973 and 3,683,252 issued on Aug. 8, 1972 and the patent to Maynard et al, U.S. Pat. No. 3,551,748 issued on Dec. 29, 1970. It is understood, however, that source 6 could constitute a direct current generator of a motor-generator set in which the field of the generator is controlled to provide the desired magnitude of unidirectional potential.

A drive shaft 9 is diagrammatically illustrated as coupled to be rotatably driven by the armature 3 and is connected to rotate a traction sheave 10 either directly or through suitable gears (not shown). An elevator car 11 is supported by a cable 12 which is reeved over the traction sheave 10, with the other end of cable 12 being connected to a counter weight 13. The elevator car 11 is movably disposed in a hoistway which includes a number of guide rails 14 to provide service to a plurality of floors, such as floor 15. The movement of car 11 in its required travel between one or more floors is precisely controlled to provide a smooth and comfortable ride in a minimum amount of time by controlling the amount and direction of direct current flow to the armature 3 of the drive motor 2.

The shunt field 4 of the D.C. motor 2 is connected to a field power supply 16 which supplies energizing power to the shunt field 4 under the control of a supervisory control 17. The supervisory control 17 may desirably function to control the operation of only a single car or may be coupled to operate a plurality of cars in a known manner.

The magnitude and direction of direct current flow applied to armature 3 by the source 6 is controlled by a velocity command and error signal generator 18 in response to a command from the supervisory control 17 as applied through an amplifying, compensating and gating control circuit 19. The generator 18 is specifically shown and illustrated in FIGS. 2 and 3 and develops a vehicle speed pattern command which is summed with a speed responsive signal $V_T$ appearing at lead 20 to provide an error speed signal output at lead 21. A tachometer 22 is coupled to the drive shaft 9 of the D.C. motor 2 and supplies the speed responsive signal $V_T$ to lead 20 which is directly proportional to the speed of rotation of shaft 9 and the velocity of car 11.

The amplifying, compensating and gating control circuit 19 is connected to a lead 23 which supplies a signal $V_A$ from the armature input circuit 5 which is proportional to the armature voltage and is further connected to lead 24 which supplies a signal $I_A$ from the source 6 which is proportional to the armature current. Generally, the armature currrent signal $I_A$ and the armature voltage signal $V_A$ are supplied to the compensating circits within 19 to compensate for motor operating losses while providing a continuous armature current limit. The circuit 19 further provides a gating control which selectively enables the dual bridge networks 7 for providing controlled amounts of both forward and reverse direction of energizing power to the armature circuit 3 according to the selective firing of the controlled rectifiers in the networks 7 in accordance with the phase relationships of the incoming three-phase power supply 8. The amplifying, compensating and gating control 19 is more fully described in the copending application of J. Maynard filed on an even date herewith and entitled "Transportation System With Malfunction Monitor" but could conveniently utilize and incorporate the circuits shown in the U.S. Pat. Nos. 3,683,252, 3,551,748 and 3,716,771.

Figure 2:
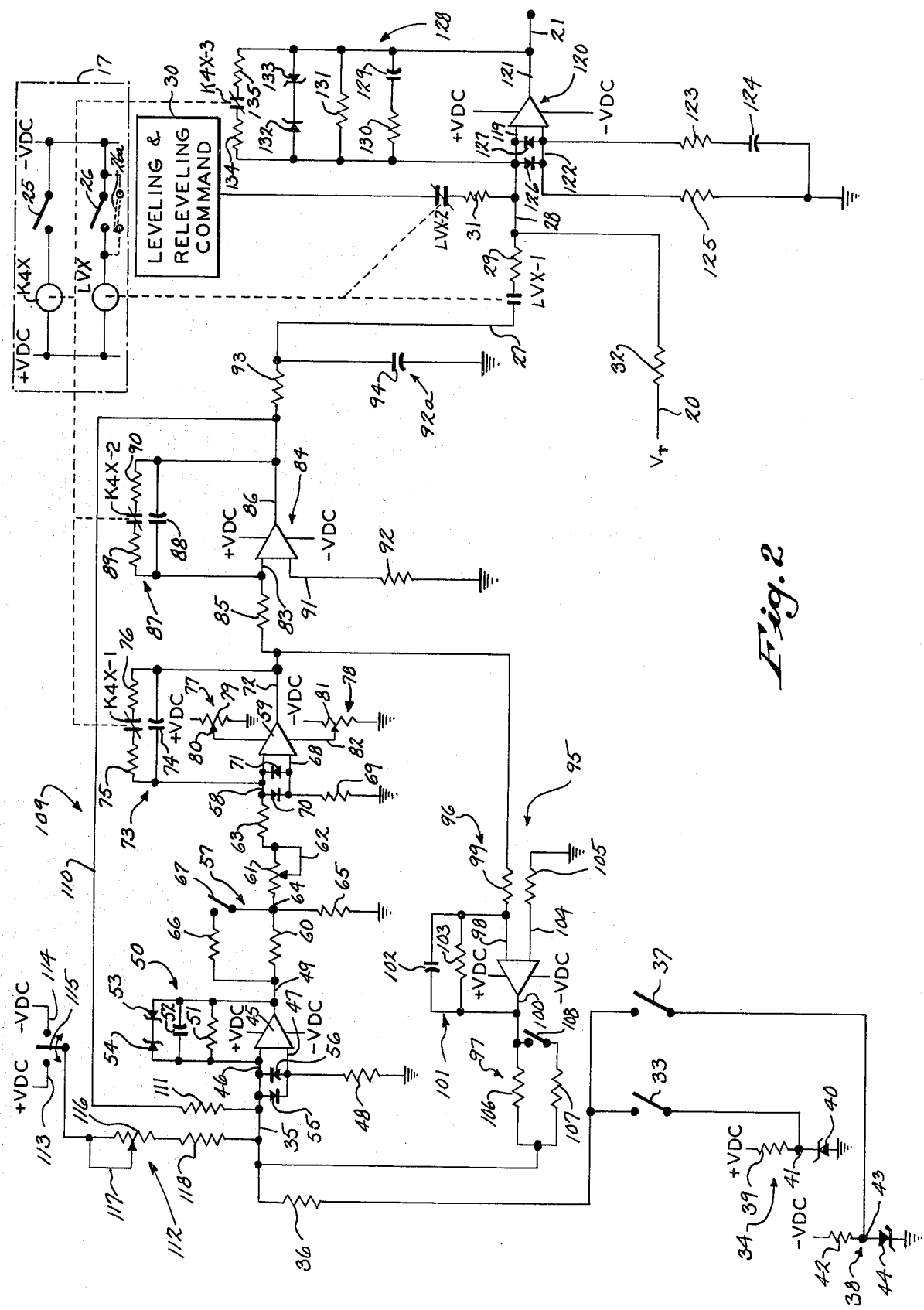
FIG. 2 is a circuit diagram showing the velocity command and error signal generator and a portion of the supervisory control of FIG. 1.

The velocity command and error signal generator 18 along with a portion of the supervisory control 17 is illustrated in a preferred embodiment in schematic form in FIG. 2. The supervisory control 17 includes a fourth kill relay K4X which is selectively connected in circuit between a positive potential D.C. voltage source +VDC and a negative potential D.C. voltage source −VDC by a switch 25. The fourth kill relay provides a number of normally closed contacts designated K4X-1, K4X-2 and K4X-3 which are connected in various feedback circuits of certain amplifiers and integrators for resetting the circuits at the end of each running operation as will be more fully described hereinafter. The switch 25 generally constitutes the normally open contacts of a potential relay as more fully described in the copending application of J. Maynard having Ser. No. 465,271, filed on an even date herewith and entitled "Transportation System With Malfunction Monitor." It is also noted that each of the contacts K4X-1, K4X-2 and K4X-3 could be controlled by separate kill relays.

A high speed leveling relay LVX within supervisory control 17 is also selectively connected in circuit between the sources +VDC and −VDC by a switch 26 which constitutes the normally closed contacts of the up and down leveling zone relays. In any event, the relay LVX is energized while the car is traveling from one floor to another and drops or de-energizes when the car approaches to within 20 inches of a landing at which it is to stop. The contacts LVX-1 are thus closed during most of a running sequence between floors to connect a velocity command pattern signal at lead 27 to a summing circuit 28 through a resistor 29 while the contacts LVX-2 remain open. As the car reaches to within 20 inches of a landing at which it is to stop, the contacts LVX-1 open and contacts LVX-2 close in response to the de-energization of relay LVX to connect a leveling and releveling command circuit 30 to the summing circuit 28 through a resistor 31 as more fully described in the copending application to J. Maynard and C. Young having Ser. No. 465,272 filed on an even date herewith and entitled Transportation System With Decelerating Control. The operation of the high speed leveling relay LVX is more fully described in the copending application of J. Maynad filed on an even date herewith and entitled "Transportation System With Malfunction Monitor." A manually operable switch 26a is shown in phantom and can be connected in parallel with switch 26 to continuously energize relay LVX during the entire traveling sequence from one landing to another so that contacts LVX-1 remain closed to permit the car to stop at a landing in response to the continuous velocity command pattern signal at lead 27 as more fully described hereinafter.

The speed responsive signal $V_T$ at lead 20 as supplied from tachometer 22 is also electrically connected to the summing circuit 28 through a resistor 32.

A switch 33 is connected in circuit to selectively connect a constant positive potential voltage source 34 to a summing circuit 35 through a resistor 36. A switch 37 is further connected in circuit to selectively connect a constant negative potential voltage source 38 to the summing circuit 35 through the resistor 36. The constant potential source 34 includes a positive potential voltage input designated +VDC which is connected to the system ground through a serially connected resistor 39 and Zener diode 40. A junction circuit 41 between resistor 39 and Zener diode 40 is connected to switch 33 for supplying a constant positive potential voltage output. the constant potential source 38 is similarly constructed and includes a negative potential voltage input designated −VDC which is connected to the system ground through a serially connected resistor 42, junction circuit 43, and Zener diode 44 with the junction 43 connected to switch 37.

The switch 33 constitutes the normally open contacts of an up direction starting relay while the switch 37 constitutes the normally open contacts of a down direction starting relay as more fully described in the copending application of J. Maynard, filed on an even date herewith and entitled "Transportation System With Malfunction Monitor." In any event, a constant positive potential voltage is connected to resistor 36 by switch 33 when the car is to travel in an up direction thereby establishing a current flow from resistor 36 to the summing circuit 35 while a constant negative potential voltage is connected to resistor 36 by switch 37 when the car is to travel in a down direction thereby establishing a current flow from the summing circuit 35 to the resistor 36.

An operational amplifier is connected to operate as a switching amplifier 45 and provides an inverting input 46 which is connected to the summing circuit 35 while a non-inverting input 47 is connected to the system ground through a resistor 48. The amplifier 45 further provides an output circuit 49 which is connected to the summing circuit 35 through a feedback circuit 50. Specifically, a parallel connected resistor 51 and capacitor 52 are connected between output 49 and input 46 for providing low impedance to noise while a pair of Zener diodes 53 and 54 are serially connected in opposing relationship to provide a bi-polar clamping circuit connected in parallel to resistor 51 and capacitor 52. A pair of diodes 55 and 56 are parallel connected between inputs 46 and 47 with the anode of diode 55 and the cathode of diode 56 connected to input 46 for protecting the amplifier 45 from severe abnormal transient currents.

A variable impeance circuit 57 electrically connects the signal appearing at output 49 of amplifier 45 to an inverting input 58 of an operational amplifier connected to operate as an integrator 59. The impedance circuit 57 includes the serially connected resistor 60, variable resistor 61 having an adjustable tap 62, and resistor 63 with a junction circuit 64 between resistors 60 and 61 connected to the circuit ground through a resistor 65. A resistor 66 is selectively connected in parallel circuit with the resistor 60 by a manually operable switch 67 so that the effective impedance of the circuit 57 may be selectively varied by the opening and closing of switch 67 and by adjusting the tap 62 of resistor 61. The resistors 60, 65 and 66 provide a voltage dividing function which will be more fully described hereinafter.

A non-inverting input 68 of integrator 59 is connected to the system ground through a resistor 69 while a pair of parallel connected diodes 70 and 71 are connected with opposite orientation between inputs 58 and 68 for protection. An output circuit 72 of integrator 59 is connected to input 58 through a feedback circuit 73 including an integrating capacitor 74. The capacitor 74 is further parallel connected to a serially connected circuit including a resistor 75, the normally closed contacts K4X-1, and a resistor 76. The resistor 75 and 76 are normally electrically disconnected from circuit by the opening of contacts K4X-1 during a running sequence. The contacts K4X-1, however, generally close after the car 11 comes to a stop at a landing to permit capacitor 74 to discharge through resistors 75 and 76 thereby resetting the integrator 59 for the next running operation.

The integrator 59 is conditioned for operation by an adjustable positive potential voltage source 77 and an adjustable negative potential voltage source 78. Specifically, the source 77 includes a positive voltage input designated as +VDC which is connected to the system ground through a variable resistor 79 having an output tap 80 connected to supply a positive voltage to the integrating circuit 59. The source 78 is similarly constructed and includes a negative voltage input designated as −VDC which is connected to the system ground through a variable resistor 81 having an output tap 82 connected to supply a negative voltage to the integrating circuit 59. The integrator 59 can employ the high performance operational amplifier marketed by Signetics as a linear integrated circuit and designated uA741 with the output tap 80 connected to the number seven terminal and the output tap 82 connected to the number four terminal of the operational amplifier. The taps 80 and 82 are thus variable to selectively adjust the positive and negative voltage levels supplied to the integrating circuit 59 to thereby selectively establish the positive and negative saturation levels, respectively, for the operational amplifier employed therein.

The output circuit 72 of integrator 59 is electrically connected to the inverting input 83 of an operational amplifier connected to operate as an integrator 84 through a resistor 85. An output circuit 86 of integrator 84 is connected through a feedback circuit 87 to the input 83 including an integrating capacitor 88. The feedback circuit 87 further includes a resetting circuit having a serially connected resistor 89, contacts K4X-2 and resistor 90 connected in parallel to capacitor 88. The contacts K4X-2 are generally open during a running operation and close after the car has stopped to discharge capacitor 88 and reset the integrator 84 for the next running operation. A non-inverting input 91 is connected to the system ground through a resistor 92. The output circuit 86 of integrator 84 is connected to the output lead 27 and contacts LVX-1 through a noise suppression filtering circuit 92a including a serially connected rsistor 93 and a capacitor 94 connected between lead 27 and the system ground.

A closed loop feedback circuit 95 connects the output circuit 72 of the integrator 59 to the summing circuit 35 and includes an inverting amplifier circuit 96 and a selectively variable impedance circuit 97. An operational amplifier within the inverting amplifying circuit 96 provides an inverting input circuit 98 which is connected to the output 72 through a resistor 99 and an output circuit 100 which is connected to the input 98 through a feedback circuit 101 having a parallel connected capacitor 102 and resistor 103. A non-inverting input 104 of amplifier 96 is connected to the system ground through a resistor 105. The variable impedance circuit 97 includes a resistor 106 serially connected between output 100 and summing circuit 35 while resistor 107 is selectively parallel connected to resistor 106 by a manually operable switch 108.

Another closed loop feedback circuit 109 includes the lead 110 which connects the output 86 of integrator 84 to the summing circuit 35 through a resistor 111.

A null adjust circuit 112 is further connected to selectively supply positive or negative offset adjustment signals to the summing circuit 35 to ensure that a velocity command signal does not appear at the output lead 27 whenever the resistor 36 is opencircuited indicating a lack of an up or down direction command. Specifically, a positive voltage source designated +VDC is connected to a switch contact 113 while a negative voltage source designated −VDC is connected to a switch contact 114. An adjustable contact 115 is connected to the summing circuit 35 through a serially connected adjustable resistor 116 having a movable tap 117 and a resistor 118. The contact 115 can be adjusted to provide either a positive or negative bias signal while tap 117 can be adjusted to control the magnitude of the offset signal supplied to summing circuit 35.

The summing circuit 28 which is connected to receive the velocity signal $V_T$ through resistor 32 and either the velocity command signal through resistor 29 and contacts LVX-1 or the leveling and releveling command through resistor 31 and contacts LUX-2 is further connected to an inverting input 119 of an operational amplifier connected to operate as a regulating amplifier 120 which supplies an output error signal to lead 21 through the output circuit 121. A non-inverting input 122 of amplifier 120 is connected to the system ground through a serially connected resistor 123 and capacitor 124 which are connected in parallel with a resistor 125. A pair of diodes 126 and 127 are parallel connected between inputs 119 and 120 in opposing relationship to protect amplifier 120 from unexpected transient signals.

A feedback circuit 128 is connected between output 121 and input 119 of amplifier 120 and includes a serially connected capacitor 129 and resistor 130 which are parallel connected with a gain setting resistor 131. A pair of Zener diodes 132 and 133 are serially connected in opposing relationship and are also parallel connected to resistor 131 for establishing a maximum limit clamp upon the output signal occurring at output 21. Furthermore, a resistor 134 is serially connected with the contacts K4X-3 and a resistor 135 wich are also connected in parallel with the resistor 131. The contacts K4X-3 are normally open during a running operation and close when the car has stopped to rapidly discharge the capacitor 129 to reset the regulating amplifier 120 for the next running operation.

The operation of the circuit in FIG. 2 can best be illustrated by reference to the graphical representations shown in FIG. 3 in which various current and voltage waveforms are displayed as functions in the ordinate axis versus time in the abscissa axis. The illustrated waveforms represent the functioning of the pattern generator during a travel sequence in the upward direction between landings or floors and it is understood that travel in the downward direction would provide the same or similar waveforms only having an opposite polarity and thus inverted. A number of vertically orientated dotted lines are shown which intersect the various abscissa to specify certain time references designated $t_0$ through $t_7$ which occur in a customary running operation.

A command velocity waveform 136 appears as a voltage at output 86 of integrator 84 and has a zero value prior to and at the time $t_0$ when an up direction start command is given by the closure of switch 33. As previous noted, a zero value of waveform 136 is provided by the null adjust circuit 112. The closure of switch 33 indicating a start command in the upward direction initiates the generation of the waveform 136 which commands the velocity at which the elevator car 11 travels from one floor to another at which a stop is to be made. The closure of switch 37, on the other hand, would provide a start command in the downward direction by supplying a waveform having a mirrored opposite polarity of waveform 136.

A signal 137 of waveform 136 occurs during the time from $t_0$ to $t_1$ and requires the elevator car 11 to travel under a preselected positive rate of change in acceleration or "jerk." The signal 138 of waveform 136 occurs during the time from $t_1$ to $t_2$ and requires the car to travel under a preselected constant acceleration. The signal 139 of waveform 136 occurs during the time from $t_2$ to $t_3$ and requires the car to travel under a preselected negative rate of change in acceleration or "jerk." The signal 140 of waveform 136 occurs during the time from $t_3$ to $t_4$ and requires the car to travel at a constant preselected velocity. The signal 141 of waveform 136 occurs during the time from $t_4$ to $t_5$ and requires the car to travel under a preselected positive rate of change of deceleration or "jerk." The signal 142 of waveform 136 occurs during the time from $t_5$ to $t_6$ and requires the car to travel under a preselected constant deceleration. Lastly, the signal 143 of waveform 136 occurs during the time from $t_6$ to $t_7$ and requires the car to travel under a preselected negative rate of change of deceleration or "jerk." The waveform 136 is thus effective for providing a velocity command signal at output lead 86 for requiring or commanding the elevator car 11 to travel in an upward direction from one floor starting at time $t_0$ to a second floor where it is brought to a stop such as at a landing 15 at time $t_7$. It should be understood, however, that the car 11 might not attain the maximum velocity or speed signal 140 on a short run, such as for one floor, for example, and that signal 139 might directly join signal 141 thereby eliminating a time period of constant velocity.

The switches 33 and 37 are selectively operated, such as by an automatic operation under the supervisory control 17, to operably connect either of the voltage sources 34 or 38 to the summing circuit 35 to provide either an up direction or down direction running operation, respectively. The following description relates to an up direction traveling sequence and it is to be understood that down direction travel will provide similar waveforms only having the opposite polarity and thus inverted. The selective operation of switch 33 will generate an up direction starting and stopping waveform 144 which appears as a voltage input signal to the resistor 36. Specifically, a positive polarity voltage signal 145 is connected to resistor 36 to provide a proportional current signal to the summing circuit 35 which immediately tends to saturate the switching amplifier 45 at the time $t_0$.

The switching amplifier 45 provides a clamped output signal at lead 49 which is supplied to the inverting input 58 of the integrator 59 through the impedance circuit 57. Thus at time $t_0$, the saturated switching amplifier 45 supplies a waveform 146 at input 58 which appears as a stepped voltage signal 147 and has a magnitude dependent upon the circuit clamping by the Zener diodes 53 and 54 and the selected impedance of the voltage divider circuit 57.

The stepped input signal 147 appearing at input 58 is integrated by the integrating circuit 59 to provide a waveform 148 at output lead 72. At the time period from $t_0$ to $t_1$, the stepped input signal 147 is integrated to provide a ramp output signal 149 which, in turn, is supplied to the inverting input 83 of the integrator 84. The ramp signal 149 is thus integrated by integrator 84 to provide the velocity output signal 137 at output lead 86.

The integrator 59 is employed in a novel manner and becomes saturated at time $t_1$ to provide a constant output signal 150 having a magnitude established by the selective setting of the voltage source circuits 77 and 78 which establish the saturation point or level for the integrator 59. The signal 150 remains from $t_1$ to $t_2$ and is integrated by integrator 84 to provide the velocity command signal 138 at output 86.

The signals 149 and 150 of waveform 148 appearing at output 72 of integrator 59 are inverted by the inverting circuit 96 to supply a waveform 151 at the output lead 100 which, in turn, is connected through the impedance circuit 97 to the summing circuit 35. The output signal 149 is thus inverted to a signal 152 while the signal 150 is inverted to a signal 153.

The current waveform 154 appears at the summing circuit 35 and represents the summation of a number of current inputs including the current flow through the resistor 36 which is proportional to the voltage waveform 144 and designated in dotted lines as waveform 144a, the current flow through resistor 111 which is proportional to the command velocity waveform 136 and designated in dotted lines as waveform 136a, and the current flow through the impedance circuit 97 which is proportional to the voltage waveform 151 and designated in dotted lines as waveform 151a and porportional to the inverted voltage waveform 148. From time $t_0$ to time $t_3$, the current signals 136a and 151a summed at summing circuit 35 which are dependent upon the waveforms 136 and 151 have an opposite polarity with respect to the current signal 144a derived from the waveform 144. As a result, a steadily decreasing but yet positive current signal 155 occurs from time $t_0$ to time $t_2$ because the current from waveform 144a is greater than the summated current waveforms 136a and 151a. The positive current signal 155 thus retains the switching amplifier 45 in a saturated condition and maintains the voltage signal 147 of waveform 146 at the input 58 to the integrating circuit 59.

At time $t_2$, however, the summated curent signals 136a and 151a become greater than the curent signal 144a from waveform 144 to provide a negative current signal 156 at the summing circuit 45. The negative current signal 156 at input 46 received from summing point 35 switches the amplifier 45 which saturates to provide a positive potential signal 157 of waveform 146 at input 58 of integrating circuit 59. The integrator 59, in turn, integrates the input signal 157 to provide an output signal 158 at 72 which, in turn, is integrated by the integrator 84 to provide the velocity command signal 139 at output circuit 86.

The decreasing ramp signal 158 is also inverted by the inverting circuit 96 to provide a ramp signal 159 at output 100. The decreasing current signal 151a dependent upon signal 159 supplied to the summing circuit 35 from time $t_2$ to time $t_3$ has the effect of summing the current signals to a zero value at the summing circuit 35 at the time $t_3$ as shownn by current signal 160 of waveform 154. A zero or balance current input at 46 turns off the switching amplifier 45 to provide a zero output signal 161 of waveform 146 at the input 58 of integrator 59. The integrator 59, in turn, provides a zero output signal 162 of waveform 148 for stopping the integrating function of integrator 84 which thus maintains a constant output signal 140 of waveform 136. The feedback signal 163 provided by the inverting circuit 96 at output 100 also goes to zero so only the two current inputs 136a and 144a to the summing circuit 35 dependent upon the waveforms 136 and 144 are summated to maintain the zero current signal 160 at input 46 of the switching amplifier 45 from time $t_3$ to time $t_4$.

The car thus travels at a constant velocity between time $t_3$ and $t_4$ until it receives a stop command to initiate a stopping sequence at a particular landing. Such stopping sequence is illustrated as occurring at time $t_4$ by the opening of switch 33 which removes the signal 145 so that waveform 144 immediately steps to a zero voltage. The switch 33 is opened by the supervisory control 17 (switch 37 operates in a like manner for a downward operation) when the car has reached a predetermined stopping position from the floor at which a stop is to be made such as sensed by a selector assembly commonly employed with elevator systems. The feedback current signal 136a dependent upon waveform 136 immediately saturates the switching amplifier 45 so that a positive stepped signal 164 appears at input 58 of the integrator 59. The integrator 59 integrates the signal 164 to provide an increasing negative ramp signal 165 at output 72 which, in turn, is integrated by integrator 84 to provide the output velocity command signal 141. The inverting circuit 96 also operates upon signal 165 for supplying an increasing ramp signal 166 at output terminal 100. The current waveform 154 at summing circuit 35 immediately steps to a predetermined current level at time $t_4$ which is determined by current waveform 136a and thereafter steadily decreases as a signal 167 in reponse to the summated currents 136a and 151a which are proportional to the waveforms 136 and 151 supplied to the summing circuit 35.

At time $t_5$, the integrating circuit 59 saturates at a level established by the voltage source circuits 77 and 78 to provide a constant magnitude output signal 168. The signal 168 is integrated by the integrating circuit 84 to provide the output velocity command signal 142 and is further inverted by the inverting circuit 96 to provide a feedback signal 169 at output 100.

At time $t_6$, the current waveform 151a supplied to the summing circuit 35 and dependent upon signal 169 becomes greater than the current waveform 136a dependent on signal 142 so that a positive summated current signal 170 appears at the input 46. The switching amplifier 45 thus responds to the positive current signal 170 by saturating to provide a stepped negative signal 171 at input 58 of integrating circuit 59. The signal 171 is integrated by integrator 59 to provide a decreasing ramp signal 172 at output 72 which, in turn, is integrated by integrator 84 to provide the velocity output signal 143. The signal 172 is also inverted by the inverting circuit 96 to provide a feedback signal 173 at output 100. The current signals 136a and 151a dependent upon signals 143 and 173 thus sum to zero at the summing circuit 35 at time $t_7$ to provide a zero output at waveform 136 which commands the car to cease movement at a position which is adjacent to a landing.

The summing circuit 28 is shown in the embodiment as selectively connected to the leveling and releveling command 30 and disconnected from the waveform 136 at output 86 by the closing of contacts LVX-2 and the opening of contacts LVX-1 at a designated time between time $t_6$ and $t_7$ to provide a redundant control, if desired. Specifically, the relay LVX drops or de-energizes in response to the opening of switch 26 when a car approaches to within 20 inches of the landing at which it is to stop which generally occurs slightly before the time $t_7$ and is designated $t_L$ on the waveform 136. The introduction of the leveling and releveling command 30 provides a signal to summing circuit 28 which is compared or combined with the speed responsive signal $V_T$ provided through resistor 32 while the waveform 136 no longer is effective for controlling the operation of the elevator car. The leveling and releveling command 30 is more specifically shown and described in the copending application of J. Maynard, filed on an even date herewith and entitled "Transportation System Having Malfunction Monitor."

If for some reason the relay LVX fails to de-energize or the contacts LVX-1 and LVX-2 fail to operate when the car approaches to within 20 inches of the landing at which it is to stop, the waveform 136 will continue to control the operation of the car and will accurately stop the car at time $t_7$ at a position adjacent to the landing such as 15 without requiring the need for leveling and releveling auxiliary circuitry which has generally been considered necessary to exact alignment between a car and a landing in previous elevator systems. It is therefore evident that the redundant leveling and releveling command 30 could be eliminated from the circuitry such as by the connection and closure of switch 26a where the building and construction codes permit so that the elevator car 11 is entirely controlled in response to the velocity command waveform 136 from starting at time $t_0$ to the final stopping at a landing at time $t_7$ without the need for additional positioning or alignment equipment in order to safely transfer passengers.

The velocity command and error signal generator 18 provides a velocity command output embodied in waveform 136 which has a limitation in the allowable rate of change of acceleration or "jerk" for the elevator car 11. Such "jerk" limitation is specifically defined by the constrained magnitude of signals 147, 157, 164 and 171 within the waveform 146. The limitation on waveform 146 is provided by establishing a preselected maximum and minimum magnitudes as illustrated by signals 147, 157, 164 and 171 through the circuit clamping by the Zener diodes 53 and 54 and the established impedance provided by the voltage dividing circuit 57. The magnitudes of signals 147, 157, 164, and 171 can be selectively adjusted by the operation of the switch 67 thereby selectively adding resistor 66 in parallel with resistor 60 to vary the voltage dividing relationship with resistor 65 of circuit 57. Once the effective voltage dividing relationship of the impedance circuit 57 has been established, the positive and negative maximum permissible magnitude for the waveform 146 is established and provides a limitation upon the rate of change of acceleration or "jerk" required of the elevator car 11.

The velocity command waveform 136 further provides a limitation upon the acceleration required of elevator car 11. The limitation on acceleration is established by confining the maximum permissible positive and negative magnitudes of the waveform 148 and specifically of the signals 150 and 168. The magnitude of signals 150 and 168 is established in a novel manner by selecting the saturation level of integrator 59 by adjusting the voltage source 77 and 78.

The velocity command waveform 136 further provides a maximum permissible velocity limitation as represented by the signal 140 which occurs between time $t_3$ and $t_4$. The limitation on velocity is provided in a novel manner by the constraints upon the magnitude of the signal 145 of waveform 144 as established by the clamped voltage source 34.

The switch 67 and the switch 108 are preferrably interconnected in a novel manner to operate simultaneously so that switch 67 is open when switch 108 is closed and vice versa. The variation of impedance within circuit 97 in response to a change in the voltage dividing relationship of circuit 57 permits the current waveform 151a to remain symmetrical so that the time durations for signals 152, 159, 166 and 173 are subsequently equal when the preselected rate of change of acceleration or "jerk" limitation is changed.

The switching amplifier 45, the integrators 59 and 84, the inverting amplifier 96 and the regulating amplifier 120 may each utilize a high performance operational amplifier selected from any one of a number of commercially available amplifiers such as, for example, the operational amplifier marketed by Signetics as a linear integrated circuit and designated uA 741.

The pattern generator thus provides a continuous command pattern speed signal to the error summing circuit 28 without receiving a continuous feedback from the operated motor or from the vehicle it controls. The novel feedback circuits 95 and 109 within the pattern generator remain continuously connected in circuit to the common summing circuit 35 for providing a command pattern speed signal having precise operating limitiations upon maximum velocity, acceleration and rate of change of acceleration. Applicants have further found that the pattern generator with the novel feedback circuits 95 and 109 is capable of stopping the car at a landing for the safe transfer of passengers without the need for auxiliary positioning control if used with suitable operating equipment.

A velocity command and error signal generator has thus been devised which is highly sophisticated but yet can be fabricated from a small number of circuit elements for controlling the operation of an elevator car within a transportation system. The invention provides a command which supplies limitations upon the maximum velocity, acceleration and rate of change of acceleration for providing a smooth and comfortable ride for passengers while expediting travel between landings.

Portions of the disclosure herein are more fully described in the copending applications filed on an even date herewith of Maynard entitled "TRANSPORTATION SYSTEM WITH MALFUNCTION MONITOR" and Maynard et al entitled "TRANSPORTATION SYSTEM WITH DECELERATING CONTROL" and such applications are incorporated by reference herein.

Various modes of carrying out the invention are contemplated as being within the scope of the following claims particularly pointing out and distinctly claiming the subject matter which is regarded as the invention.

We claim:

1. A transportation system having a guide path structure and a plurality of spaced landings and transportation means comprising a transport vehicle, means mounting said vehicle for movement relative to the structure in a path extending adjacent each of said landings, motive means moving said vehicle relative to the structure, vehicle responsive means coupled to said transportation means and providing a signal directly proportional to the speed of said vehicle, control means cooperating with said motive means and moving said vehicle relative to the structure and stopping said vehicle at a selected landing and including pattern generating means supplying a vehicle speed command signal operatively controlling the maximum velocity, acceleration, and rate of change of acceleration of said vehicle and first summing means operatively summing said vehicle speed signal and said vehicle speed command signal and providing an output speed error signal operatively controlling the movement of said vehicle, said pattern means including first means generating a first signal imposing a limitation upon the maximum vehicle velocity and second means generating a second signal imposing a limitation upon the maximum vehicle rate of change of acceleration and third means integrating said second signal and providing a third signal and directly imposing a limitation upon said third signal to limit the maximum vehicle acceleration and fourth means coupled to receive said third signal and generating a fouth signal providing said vehicle speed command signal and second summing means operatively summing said first, third and fourth signals and supplying an input to said second means.

2. The system of claim 1, and including fifth means coupled to said third means and to said second summing means and operatively inverting said third signal to have the proper polarity when summing at said second summing means.

3. The system of claim 1, wherein said first means includes means providing a first polarity signal and said third and fourth means each includes means providing second polarity signal for summing at said second summing means during an accelerating mode of operation.

4. The system of claim 1, wherein said control means includes means operatively removing said first signal and said third means including means providing a first polarity signal and said fourth means including means providing a second polarity signal for summing at said second summing means during a decelerating mode of operation.

5. The system of claim 1, wherein said first means includes an input circuit having an output selectively connected to said second summing circuit and providing a run command signal having a predetermined magnitude limitation establishing a limitation upon the maximum vehicle velocity.

6. The system of claim 1, wherein said first means includes positive and negative potential inputs selectively connected to said second summing circuit and each input including a voltage source connected to a ground potential through a serially connected resistor and Zener diode and providing constant signals establishing a limitation upon the maximum vehicle velocity.

7. The system of claim 1, wherein said second means includes amplifier means having feedback clamping means limiting the magnitude of said second signal to impose the limitation upon the maximum vehicle rate of change of acceleration.

8. The system of claim 1, wherein said third means includes integrating means and source means establishing a preselected saturation level of said integrating means to impose the limitation upon the maximum vehicle acceleration.

9. The system of claim 1, wherein said fourth means includes integrating means having capacitive feedback means providing said vehicle speed command signal.

10. A transportation system having a guide path structure and a plurality of spaced landings and transportation means comprising a transport vehicle, means mounting said vehicle for movement relative to the structure in a path extending adjacent each of said landings, motive means moving said vehicle relative to the structure, vehicle responsive means coupled to said transportation means and providing a speed signal representative of the actual velocity of said vehicle, control means cooperating with said motive means and moving said vehicle relative to the structure and stopping said vehicle at a selected landing and including pattern generating means supplying a vehicle speed command signal operatively controlling the maximum vehicle velocity, acceleration, and rate of change of acceleration of said vehicle and first summing means operatively summing said speed signal and said vehicle speed command signal and providing an output speed error signal operatively controlling the movement of said vehicle, said pattern means including first means generating a first signal imposing a limitation upon the maximum vehicle velocity and second means generating a second signal providing said vehicle speed command signal and second summing means providing an analog output varying according to a summed magnitude of said first and second signals and operatively controlling the operation of said second means.

11. A transportation system having a guide path structure and a plurality of spaced landings and transportation means comprising a transport vehicle, means mounting said vehicle for movement relative to the structure in a path extending adjacent each of said landings, motive means moving said vehicle relative to the structure, vehicle responsive means coupled to said transportation means and providing a speed signal representative of the actual velocity of said vehicle, control means cooperating with said motive means and moving said vehicle relative to the structure and stopping said vehicle at a selected landing and including pattern generating means supplying a vehicle speed command signal operatively controlling the maximum velocity and acceleration of said vehicle and first summing means operatively summing said speed signal and said vehicle speed command signal and providing an output speed error signal operatively controlling the movement of said vehicle, said pattern means including first means generating a first signal imposing a limitation upon the maximum vehicle velocity and second means generating a second signal imposing a limitation upon the maximum vehicle acceleration and second summing means providing an analog output varying according to the summed magnitude of said first and second signals and operatively controlling the operation of said second means and third means operatively responding to said second signal and providing said vehicle speed command signal.

12. The system of claim 11, and including fourth means coupled to said second means and to said second summing means and inverting said second signal to have the proper polarity for summing at said second summing means.

13. A transportation system having a guide path structure and a plurality of spaced landings and transportation means comprising a transport vehicle, means mounting said vehicle for movement relative to the structure in a path extending adjacent each of said landings, motive means moving said vehicle relative to the structure, vehicle responsive means coupled to said transportation means and providing a signal representative of the operation of said vehicle, control means cooperating with said motive means and moving said vehicle relative to the structure and stopping said vehicle at a selected landing and including pattern generating means supplying a vehicle command signal operatively controlling the maximum velocity, acceleration, and rate of change of acceleration of said vehicle, and first summing means operatively summing said vehicle responsive signal and said vehicle command signal and providing an output error signal operatively controlling the movement of said vehicle, said pattern means including second summing means, a first amplifier having an output and an input electrically connected to said second summing means and a clamping circuit connected between said input and said output and providing a limitation upon the maximum vehicle rate of change of acceleration, a first integrator having an input electrically connected to said first amplifier output and an output with a capacitive feedback circuit connected to said input and a source circuit establishing a preselected saturation level providing a limitation upon the maximum vehicle acceleration, a second amplifier having an input electrically connected to said first integrator output and an output electrically connected to said second summing means, a second integrator having a capacitive feedback circuit and an input electrically connected to said first integrator output and an output electrically connected to said first and second summing means and providing said vehicle command signal, and an input circuit having an output electrically connected to said second summing means for selectively providing a running command signal to said summing means having a preselected magnitude establishing a limitation upon the maximum vehicle velocity.

14. The system of claim 13, wherein said first amplifier output includes a variable voltage dividing circuit having a selectively adjustable impedance for setting the maximum limitation upon the rate of change of acceleration.

15. The system of claim 14, wherein said second amplifier output includes a circuit having a selectively adjustable impedance for maintaining a symmetrical waveform for said vehicle command signal for any selected limitation upon the rate of change of acceleration.

16. The system of claim 13, and including a biasing circuit connected to said second summing means and adjusting said vehicle command signal to zero when said pattern means is not required to command movement of said vehicle.

17. A transportation system comprising a motor, a vehicle driven by said motor, a path along which said vehicle is driven having a plurality of spaced landings, means generating a vehicle command velocity signal as a function of time operatively and continuously connected and accelerating and decelerating said vehicle to stop at one of said landings through the energization of said motor including first means generating a first signal providing a limitation upon maximum vehicle velocity and second means generating a second signal providing a limitation upon maximum vehicle rate of change of acceleration and third means integrating said second signal and providing a third signal and directly imposing a limitation upon said third signal to limit the maximum vehicle acceleration and fourth means coupled to said third means and generating a fourth signal providing said vehicle command signal and summing means operatively summing said first, third and fourth signals and supplying an input to said second means.

18. A transportation system comprising a motor, a vehicle driven by said motor, a path along which said vehicle is driven having a plurality of spaced landings, means generating a vehicle command velocity signal as a function of time operatively and continuously connected and accelerating and decelerating said vehicle to stop precisely at one of said landings through the energization of said motor including first means generating a first signal providing a limitation upon the maximum vehicle velocity and second means generating a second signal imposing a limitation upon the maximum vehicle acceleration and summing means providing an analog output varying according to the summed magnitude of said first and second signals and operatively controlling the operation of said second means and third means operatively responding to said second signal and providing said vehicle command signal.

19. A transportation system comprising a motor, a vehicle driven by said motor, a path along which said vehicle is driven having a plurality of spaced landings, means generating a vehicle command velocity signal as function of time and providing a limitation upon the maximum velocity, acceleration and rate of change of acceleration for said vehicle and operatively and continuously connected and accelerating and decelerating said vehicle to stop precisely at one of said landings through the energization of said motor including first means generating a running signal providing a limitation upon the maximum vehicle velocity by having magnitude limitation and a second means generating a second signal comprising said vehicle command signal and summing means providing an analog output varying according to the summed magnitude of said first and second signals and operatively controlling the operation of said second means.

20. A transportation system comprising a motor, a vehicle driven by said motor, a path along which said vehicle is driven, a command circuit generating a vehicle command signal as a function of time operatively controlling the movement of said vehicle and including first means supplying a run signal and including switching amplifying means and clamped feedback means and providing an output signal having a predetermined magnitude to limit the vehicle rate of change of acceleration and third means operatively receiving said second signal and providing said vehicle command signal.

21. The system of claim 20, wherein said second means includes voltage dividing means connected to an output of said switching amplifying means and having a selectively variable impedance for pre-selecting a desired rate of change of acceleration.

22. A transportation system comprising a motor, a vehicle driven by said motor, a path along which said vehicle is driven, a command circuit generating a vehicle command signal as a function of time operatively controlling the movement of said vehicle and including first means supplying a run signal and second means operating in response to said run signal and including integrating means having selectively adjustable positive and negative source means pre-selecting the positive and negative saturation levels of said integrating means and providing a second signal having a limitation upon the vehicle acceleration and third means receiving said second signal and providing said vehicle command signal.

23. A transportation system comprising a motor, a vehicle driven by said motor, a path along which said vehicle is driven having a plurality of spaced landings, means generating a vehicle command signal as a function of time operatively accelerating and decelerating said vehicle to stop at one of said landings through the energization of said motor including first means generating a first signal providing a limitation upon maximum vehicle velocity and second means generating a second signal providing a limitation upon maximum vehicle rate of change of acceleration and third means operating in response to said second signal and providing a third signal providing a limitation upon maximum vehicle acceleration and fourth means operating in response to said third signal and generating a fourth signal providing said vehicle command signal and a common summing point connected to operatively sum said first, third and fourth signals and supply an input controlling the operation of said second means.

* * * * *

UNITED STATES PATENT AND TRADEMARK OFFICE
CERTIFICATE OF CORRECTION

PATENT NO. : 3,941,214
DATED : March 2, 1976
INVENTOR(S) : Christopher Young and John T. Maynard It is certified that error appears in the above-identified patent and that said Letters Patent are hereby corrected as shown below:

| | |
|---|---|
| Column 1, Line 35, | Delete "Sych" and substitute therefor ---Such---; |
| Column 3, Line 30, | Delete "feedback" and substitute therefor ---fedback---; |
| Column 5, Line 1, | Delete "too" and substitute therefor ---to---; |
| Column 5, Line 67, | Delete "amunt" and substitute therefor ---amount---; |
| Column 7, Line 22, | Delete "Maynad" and substitute therefor ---Maynard---; |
| Column 7, Line 48, | Delete "the" and substitute therefor ---The---; |
| Column 8, Line 19, | Delete "impeance" and substitute therefor ---impedance---; |
| Column 9, Line 25, | Delete "rsistor" and substitute therefor ---resistor---; |
| Column 10, Line 19, | Delete "wich" and substitute therefor ---which---; |
| Column 12, Line 9, | Delete "por-" and substitute therefor ---pro----; |
| Column 12, Line 23, | Delete "curent" and substitute therefor ---current---; |

UNITED STATES PATENT AND TRADEMARK OFFICE
CERTIFICATE OF CORRECTION

PATENT NO. : 3,941,214
DATED : March 2, 1976
INVENTOR(S) : Christopher Young and John T. Maynard It is certified that error appears in the above-identified patent and that said Letters Patent are hereby corrected as shown below:

| | |
|---|---|
| Column 12, Line 24, | Delete "curent" and substitute therefor ---current---; |
| Column 12, Line 41, | Delete "shownn" and substitute therefor ---shown---; |
| Column 13, Line 13, | Delete "reponse" and substitute therefor ---response---; |
| Column 14, Line 61, | Delete "subse-" and substitute therefor ---substan----; |
| Column 14, Line 62, | Delete "quently" and substitute therefor ---tially---; |
| Column 17, Line 53, | Delete ", (comma)" after "vehicle"; |
| Column 19, Line 1, | After "as" insert ---a---; |
| Column 19, Line 21, | After "and" insert ---second means operatively receiving said run signal and---. |

Signed and Sealed this

Third Day of August 1976

[SEAL]

Attest:

RUTH C. MASON
Attesting Officer

C. MARSHALL DANN
Commissioner of Patents and Trademarks